Sept. 6, 1932.   R. S. WHALEY   1,876,439
STRAINER
Filed July 9, 1930
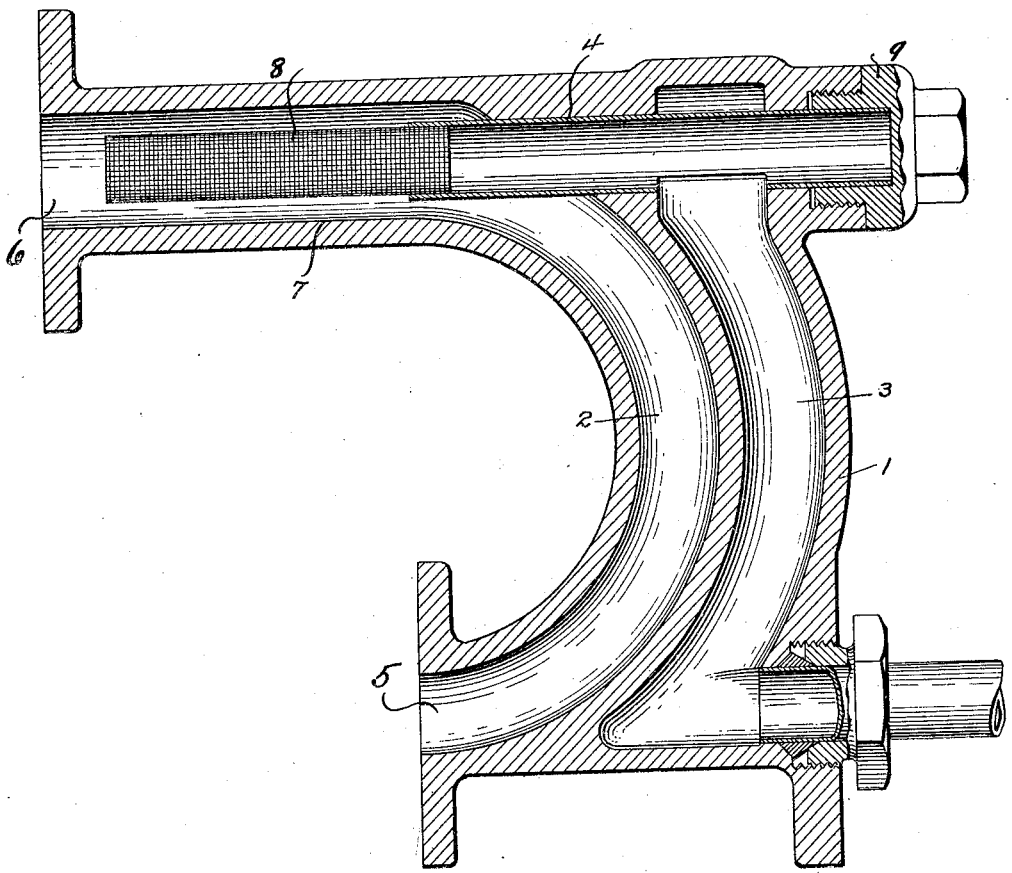
INVENTOR.
Ralph S. Whaley.
BY
Kiddle, Margeson and Hornidge
ATTORNEYS.

Patented Sept. 6, 1932

1,876,439

UNITED STATES PATENT OFFICE

RALPH S. WHALEY, OF SEATTLE, WASHINGTON, ASSIGNOR TO PETROLEUM HEAT AND POWER COMPANY, OF NEW YORK, N. Y., A CORPORATION OF DELAWARE

STRAINER

Application filed July 9, 1930. Serial No. 466,648.

My invention relates to improvements in strainers and is particularly directed to a strainer for use in connection with oil burner systems in which a pump is employed for supplying oil to the burner. In such systems the pump is so designed and is rotated at such speed that more oil is circulated than is necessary to meet the requirements of the burner. It is customary therefore to by-pass this excess oil back to the supply tank, only enough oil going to the burner to meet the demands thereof.

One of the objects of my invention is the provision of a strainer particularly adapted for use in such a system and so designed and so disposed in the system that not only will the oil that is passed to the burner be strained to rid the same of foreign material, but the strainer will be kept clean at all times.

Another object of my invention is the provision of a strainer of such design and located in a coupling or housing in an oil burner system that the oil passing to the burner will be strained to remove foreign material therefrom while the remainder or surplus oil which is returned to the supply tank will wash or remove all impurities from the screen or strainer and maintain the same clean at all times.

A further object of my invention is the provision of an arrangement such as that just briefly outlined in which the strainer will always be immersed in oil thereby preventing any air passing through the strainer into the burner line.

Other objects of my invention will be manifest from the following description and the accompanying drawing.

In the drawing 1 designates a unitary coupling or housing adapted to be inserted in the oil circuit of an oil burner system, this coupling being provided with two intercommunicating conduits 2 and 3, maintained in communication with each other by a tube 4. The port 5 of this coupling is adapted to be connected to the discharge side of a pump (not shown) and the port 6 to a supply tank (not shown). The conduit 3 is connected to the burner line. The sleeve or tube 4 by which the conduits 2 and 3 are maintained in communication projects into the conduit 2, this projecting portion being provided with a cylindrical strainer or screen 8. The bore which receives the tube 4 is closed at its outer end by means of a removable plug 9 for convenience of insertion and removal of the strainer or screen, the screen and tube being removable as a unit. The conduit 2 projects beyond the tube 4 and screen 8 and surrounds the screen, as shown at 7, whereby all the oil passing through the conduit 2 necessarily engages the screen, so that the oil passing to the conduit 3 is first strained to rid it of any foreign material, while the surplus oil which is discharged through the discharge port 6 of the conduit 2 and is returned to the supply tank (not shown) will wipe the screen to remove any foreign material lodged thereon.

It will be appreciated that inasmuch as the screen 8 is so located in the extension 7 of conduit 2 that the screen is surrounded by and spaced from the conduit, the screen will always be immersed in oil and the entry of air to the burner conduit 3 will be prevented.

From the foregoing it will be seen that part of the oil passing through the conduit 2 will be strained by screen 8 and pass through the conduit 3 to the burner, while the surplus oil will pass along and in contact with the screen to clean the same, and be discharged through the extension or portion 7 of the conduit 2 and returned to the supply tank.

While I have described my invention as being particularly well adapted for use in oil burner systems it is to be understood that it is equally well adapted for other fluid systems as will be understood by those skilled in the art.

It will also be understood that the arrangement shown in the drawing is merely illustrative and that I do not wish to be limited to this precise construction inasmuch as many variations and modifications may be made therein without departing from the spirit and scope of my invention.

What I claim is:—

In combination a unitary coupling constructed to provide two intercommunicating conduits within the coupling, a tube removably mounted in said coupling and providing a communicating connection for the flow of fluid from the first conduit intermediate its ends to the second conduit, and a strainer within the coupling and carried by said tube and removable therewith, said strainer extending into and terminating within the first conduit.

This specification signed this 1st day of July, 1930.

RALPH S. WHALEY.